United States Patent [19]

Jackson

[11] 4,188,705

[45] Feb. 19, 1980

[54] THERMAL BARRIER STITCHING APPARATUS

[75] Inventor: James C. Jackson, Bartlesville, Okla.

[73] Assignee: Ethyl Corporation, Richmond, Va.

[21] Appl. No.: 942,953

[22] Filed: Sep. 18, 1978

Related U.S. Application Data

[63] Continuation of Ser. No. 697,986, Jun. 21, 1976, abandoned.

[51] Int. Cl.$^2$ .............................................. B23P 23/04

[52] U.S. Cl. ...................................... 29/564.6; 29/509

[58] Field of Search .......... 29/564.1, 564.6, 417.33 K, 29/450, 451, 509, 514, 515, 796, 819, 155 R; 242/110.1, 110.3; 83/208

[56] References Cited

U.S. PATENT DOCUMENTS

| | | | |
|---|---|---|---|
| Re. 28,086 | 1/1974 | Holliday et al. | 29/155 R X |
| 2,639,871 | 5/1953 | Koch | 242/110.3 |
| 3,295,195 | 1/1967 | Burgio, Jr. | 29/564.6 X |
| 3,406,601 | 10/1968 | Clifford | 83/208 X |
| 3,420,026 | 1/1969 | Nolan | 29/509 |
| 3,992,726 | 11/1976 | Jackson | 29/509 X |

*Primary Examiner*—Horace M. Culver
*Attorney, Agent, or Firm*—Donald L. Johnson; John F. Sieberth; Paul H. Leonard

[57] ABSTRACT

An apparatus or complete machinery line assembly is provided for stitching or crimping an insulating or thermal barrier member in a metal member or members. The assembly comprises a reel or unwind stand for holding and supplying insulating or thermal barrier material, a reel feeder for receiving the barrier material from the reel and feeding or inserting it into the metal member or members, a guide box for holding a metal member or members in position during feeding or insertion operations, a stitcher or crimping machine for crimping the metal members and barrier member together and a take-off or run-out table for receiving thermal barrier shapes from the crimping operation. The unwind stand, feeder, stitcher, guide box and take-off table are positioned in a line one after the other to form a continuous production line for making a unitary thermal barrier or thermal break construction element. The stitcher or crimping machine comprises a plurality of guide stations and crimping or stitching stations arranged alternately and adjacent each other. Each guide station is made as a removable block unit having an upper and lower block. The guide block units are made for handling particular metal shapes. The crimping or stitching stations are fixed and can accommodate an unlimited number of shapes. Preferably, a first stitch station crimps one side of a metal member and a second stitch station crimps the other side of the metal member or one side of another metal member.

16 Claims, 17 Drawing Figures

THERMAL BARRIER STITCHING APPARATUS

This is a continuation of application Ser. No. 697,986, filed on June 21, 1976, and now abandoned.

BACKGROUND OF THE INVENTION

The present invention generally relates to an apparatus and method for making a unitary construction element or shape having an insulating or thermal barrier member therein, commonly referred to as a thermal barrier or thermobreak extrusion or shape, which can be employed in the construction of windows, doors, frames therefor, curtain walls and the like.

The invention particularly relates to an apparatus for making a unitary construction element, wherein an insulating member is joined to a metal member or members by a crimping or stitching operation.

With the advent of metal construction used in making windows, doors, frames therefor, curtain walls and the like, problems of heat conduction and water condensation have arisen. The use of aluminum or other metals caused a greater transfer of heat between wall elements than had heretofore taken place in earlier types of construction. To solve this problem, some type of insulating or thermal break construction was essential. Accordingly, a variety of thermal barrier or thermobreak constructions and methods and apparatuses for making such constructions have been developed.

One type of construction which has achieved some degree of success is one in which the insulating material is poured, flowed, foamed, and formed in place. U.S. Pat. Nos. 3,204,324; 3,332,170; 3,393,487; 3,624,885 (Re. 28,084 and Re. 28,086); 3,634,565; and 3,823,524 are illustrative of such type of construction. Of these, 3,204,324 is representative of a method of making a thermal barrier construction element or insulating construction, wherein a metal shape having a generally U-shaped channel therein is filled with a flowing resinous insulating composition; the composition is cured, and subsequently a portion of the metal member or web forming the base of the channel is removed. No. 3,823,524 relates to a similar method but employs a web member which extends convexly between the structural member forming the channel. Both of these methods require the use of a liquid resinous composition which is subsequently cured or hardened. No. 3,393,487 discloses a somewhat more complicated process for making a thermal insulating joing construction and also utilizes a liquid plastic material. In such process, two separate elongated metal shapes are spaced apart and fastened together with a solid first insulating member. The two shapes and the first insulating member provide a channel in which a second thermal insulating member is flowed therein. Upon solidification of the latter, the metal and insulating members are locked together as an integral unit.

Of the more common types of thermal barrier constructions, two metal members are joined together by a solid insulating member. These constructions encompass a wide variety of insulating and/or plastic shapes and metal shapes. Illustrative of these are U.S. Pat. Nos. 2,835,360; 3,093,217; 3,099,337; 3,289,377; 3,436,884; 3,487,580; 3,600,857; and 3,916,503. In one of the more basic of this type of construction, for example, in 2,835,360, two metal members are joined together and spaced apart by an overlapping insulating member. In 3,916,503, simple mechanical means are employed to join the metal members with an insulating member. No. 3,600,857 is representative of more complex shapes of insulating and metal members.

In a particular type of the foregoing more common type of thermal barrier constructions, metal and insulating members are mechanically joined together by deformation of the metal members or by crimping or stitching the metal members on the insulating member. Representative of such a joining method are U.S. Pat. Nos. 3,114,179; 3,411,995; 3,420,026; 3,517,472; and 3,903,217 and Swiss Pat. No. 320,988 (same as British Pat. No. 768,499). For example, 3,420,026 discloses several types of thermal insulating members and methods of making them. In one type, two separate metal members are mechanically joined to a central insulating member by crimping or deformation of groove means or projections on the metal members. In one particular type of thermal break construction, the insulating member is in the shape of a Maltese cross in cross-section. In another embodiment, the insulating member is made from a thermoplastic material and a portion thereof is heated to cause melting and flow of the plastic into an associated groove means formed by the two metal members. Upon cooling of the plastic, the metal and plastic member are unitarily joined together. No. 3,517,472 also illustrates a mechanical joining process similar to that of the former and additionally represents the use of a plastic or insulating member which expands upon heating. The Swiss patent discloses several types of window or door frames, one of which employs a crimp system using two separate metal extrusions having a pair of flanges thereon which form grooves for receiving a plastic rod. After the plastic rod or thermal barrier member is introduced into the grooves, the flanges are pressed towards the plastic rod or crimped thereon so that they are flush with the sides of the rod.

Other types of thermal break or insulated window or wall constructions are illustrated by U.S. Pat. Nos. 2,654,920; 3,055,468; 3,289,377; 3,411,254; and 3,446,801. For example, No. 3,411,254 provides a plastic thermobreak which utilizes a plastic locking strip which contains a heat actuated blowing agent to join two separate metal shapes. After assembly of the two metal shapes and the plastic strip, the unit is heated to expand the plastic into tight engagement with the two metal members.

U.S. Pat. No. 3,815,216 illustrates still another method of manufacturing a thermal break construction element and employs a metal extrusion which has a removable interior section which is subsequently removed to separate the extrusion into two metal members. While maintaining the separate metal members spaced apart, a plastic material is inserted therebetween. The construction element can be made in a continuous operation.

Of these various types of thermal break constructions, the system of crimping or stitching has enjoyed considerable commercial success. In such systems, crimping is often done manually or by simple mechanical means. Such means are of course relatively slow and have limited flexibility. One current stitching system consists of a feeder for inserting straight lengths of vinyl or other suitable plastic insulating members in the metal members. Rollers are employed to provide crimping of the metal flanges on the insulating or plastic member. Conventionally, two rollers or wheels are required to crimp the flanges. One roller must actually bend the metal flanges on the insulating member while the other roller must back-up or hold the metal extrusion in the correct position for joining metal and plastic members. To accomplish the crimping action, clear access must be available on both sides of the plastic member on which crimping of the metal members occurs. In some cases, a small wheel or support is laterally employed to serve as a back-up. The size of the support and the forces required to obtain a tight joint create a number of operating problems. The types of shapes or extrusions which can be used in this method are extremely limited. Finished parts have to be removed by hand after the stitching or crimping operation is completed.

It is therefore a primary object of the present invention to provide a crimp or stitching system or method of making thermal barrier extrusions which overcomes the disadvantages of prior art systems and which can be used with a wide variety of metal shapes or extrusions.

An important object of the invention is to provide a complete machinery line assembly or apparatus for rapidly and efficiently manufacturing thermal barrier or thermobreak extrusions shapes or members.

Another object of the present invention is to provide a stitcher or crimping machine which can quickly and easily be adjusted to handle a wide variety of metal shapes.

Still another object of the invention is to provide an elongated guide box which is adapted to handle a large number of metal shapes or extrusions of different configurations.

Other objects and advantages of the present invention will become more readily apparent from a consideration of the description and drawings hereinafter.

SUMMARY OF THE INVENTION

The present invention provides a complete machinery line assembly for manufacturing thermal barrier members or construction elements, especially those unitary thermal barrier members or construction elements used to make aluminum windows, doors, frames therefor and the like, comprising metal members joined together by an insulating member. The apparatus or machinery comprises a reel or unwind stand for holding and supplying insulating or thermal barrier material, such as a reel of vinyl of a predetermined size and cross-section; a feeder for receiving the insulating material from the reel and inserting it into metal members or shapes for joining relationship therewith; a guide box for receiving and holding in place the metal members or shapes which are to be joined with an insulating member; a stitcher or crimping machine for crimping the metal members on an insulating member; and, a take-off unit or run out table for receiving finished parts or thermal barrier shapes from the crimping or stitching operation. The unwind stand, feeder, stitcher, guide-box and take-off table are positioned or located in a line one after the other to form a continuous production line for making unitary thermal barrier construction elements or members from an insulating member and a metal member or members.

The stitcher or crimping machine comprises a plurality of guide stations and crimping stations arranged alternately and adjacent each other. Each guide station comprises a removable block unit having an upper and lower block. A guide block unit is so constructed as to handle a particularly shaped or configured (in cross-section) metal member. The crimping stations are fixed and are adapted to accommodate a wide variety of shapes. Preferably, there are at least two stitch stations, with a first stitch station for crimping one side of a metal member and a second stitch station for crimping one side of another metal member or another side of the same metal member.

BRIEF DESCRIPTION OF THE DRAWING

The features and advantages of this invention will be more readily apparent in the following detailed description of illustrated embodiments which is to be read in connection with the accompanying drawings, wherein.

DESCRIPTION OF THE PREFERRED EMBODIMENT

Figure 1:
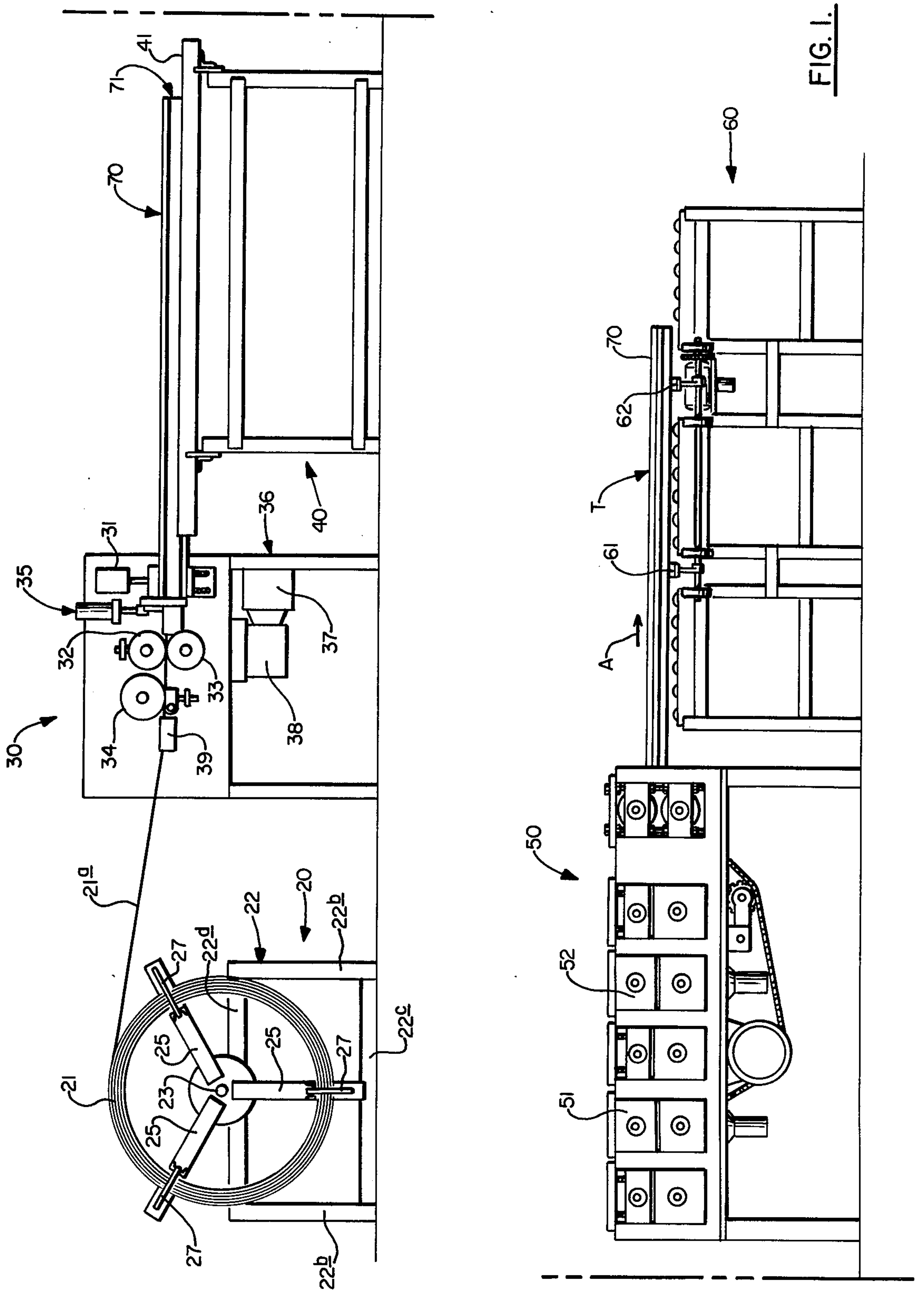
FIG. 1 is a front view of the complete machinery line assembly of the invention illustrating the various components thereof and their positions relative to each other.

Referring now to the drawings, especially FIG. 1, the various components or units comprising the complete machinery line assembly or apparatus and their relative position or relation to each other are illustrated. Each of the various units is in alignment with the other so as to provide the basis for a continuous operation. The assembly comprises five basic units, a reel or unwind stand 20, a reel or thermal barrier feeder 30, a guide box unit 40, a stitcher or crimping unit 50, and a take-off unit 60. The machinery is especially adapted to install a thermal barrier or insulating material in aluminum extrusions or shapes to provide a unitary thermal barrier shape or thermal break constructions element. The apparatus is particularly adapted to make a type of thermobreak construction wherein the thermal barrier is stitched or crimped in place. Such an element is especially useful in the manufacture of aluminum windows, doors, frames therefor, curtain walls and the like.

In the operation of the apparatus, a reel of thermal barrier material 21 is positioned on the unwind stand 20. One end of the reel 21 is inserted in the feeder 30. The thermal barrier insulating material is preferably a vinyl or foamed PVC. Any other suitable type of material may be used. The crosssection shape of the material is of a size and shape to be received by or inserted in a pair of appropriately designed metal shapes 70 and 71. For most operations, two separate metal shapes, preferably extruded aluminum shapes are employed. In some instances, it may be desirable to use a single metal shape in which a portion thereof is removed therefrom after the operation is complete. A single metal shape would have an appropriately constructed opening therein for receiving the barrier or insulating material.

Two metal or aluminum shapes 70 and 71 are properly positioned on a guide box 41 of the guide box unit 40 by an operator. The metal shapes are then slid into the feeder 30 and properly positioned therein to receive the thermal barrier material. Shapes are customarily about sixteen feet in length, but may be of any length desired. A foot switch (not shown) actuates a clamp 31 which holds the aluminum shapes 70 and 71 in position. A pair of drive wheels 32 and 33 are actuated and feed the barrier portion **21*a* into the shapes 70 and 71. The length of the material or barrier 21*a* inserted is controlled by a pre-set or pre-determined setting on a counter connected to a measuring wheel 34 riding on the barrier. The barrier or insulating material comes off the reel as it travels through the feeder until the pre-set length is reached. The drive wheels then stop and a knife 35 is actuated which cuts or separates the barrier section 21*a* in the aluminum shapes 70 and 71 from the reel 21 and the clamp 31 is released. The operator then inserts the combination of metal shapes 70 and 71 and barrier section 21*a* into the stitcher 50. A first stitch or crimp station 51 of the stitcher 50 causes the metal on one side of the barrier 21*a* to be crimped thereon. The combination is continued through the stitcher without any further help from the operator. As the combination passes through a second stitch station 52, the metal on the other side of the barrier 21*a* is crimped thereon. The completed thermal barrier construction element or shape T is moved or driven in the direction indicated by arrow A where it is received by the take-off unit 60. As the finished part or element T clears the stitcher 50, and electric eye (not shown) located between the stitcher 50 and the take-off unit 60 actuates dump arms 61 and 62** causing the arms to raise and slide the finished part T into a basket or other suitable receptacle. Once the operation has been started, the operator does not have to move from the one location by the feeder. As soon as the combination clears the guide box into the stitcher, the operator places another pair of metal shapes on the guide box and slides them into the feeder to provide a substantially continuous operation.

Although the operation is described employing two metal shapes, a single metal shape can be used. When using a single metal shape, the procedure is substantially the same except after the part T is transferred to the receiving basket, the part must be subjected to the further operation of removing a pre-determined portion of the metal shape therefrom to thereby provide the thermal barrier or break in the finished part. The details of the various components of the assembly are described in more detail hereinafter.

Figure 3:
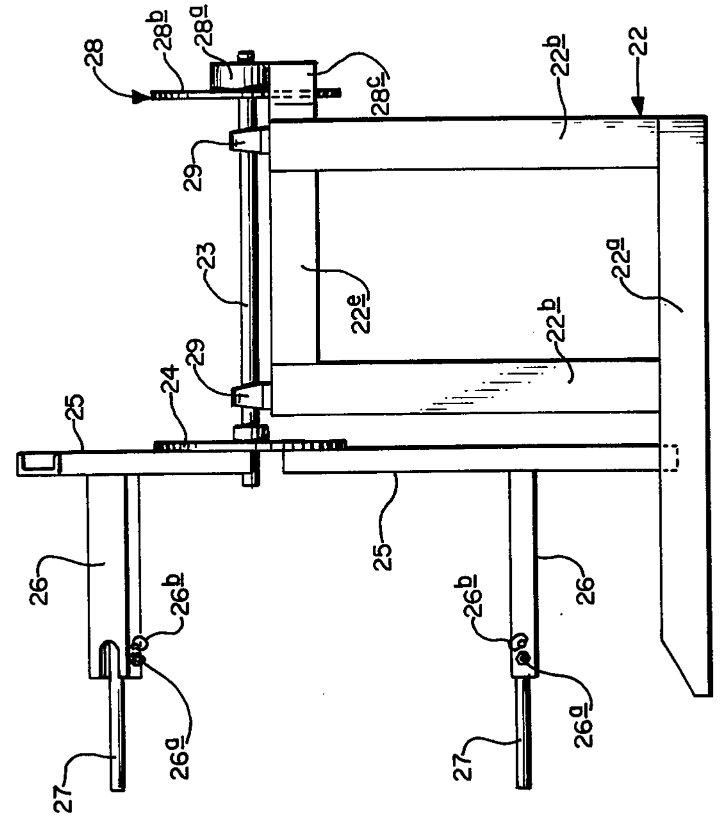
FIG. 3 is a side view of the unwind stand of FIG. 2.
Figure 2:
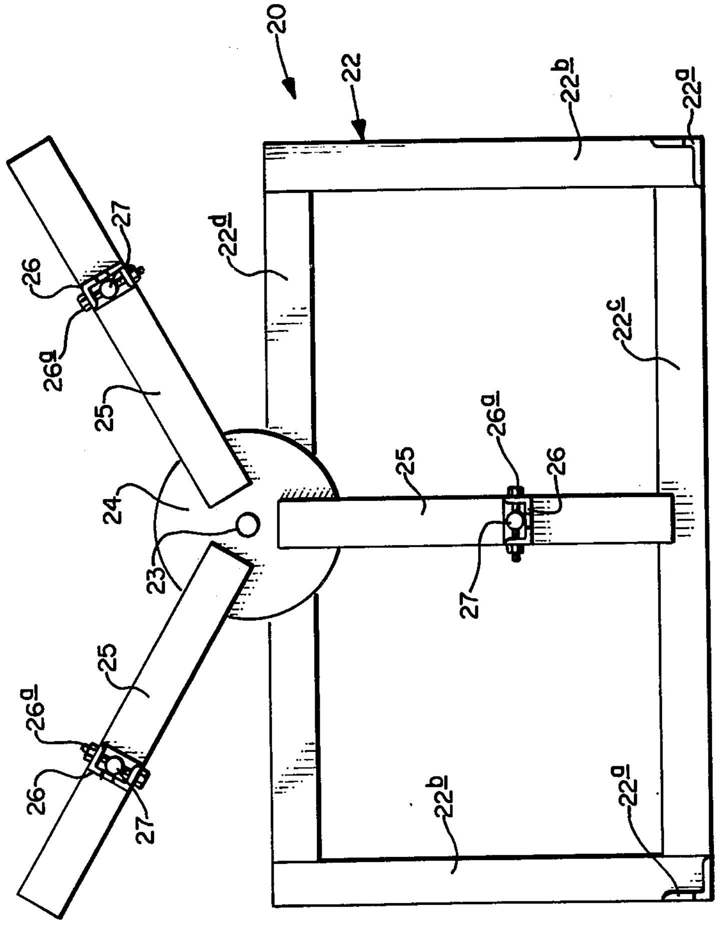
FIG. 2 is an enlarged front view of the unwind stand or reel support of the assembly line machinery of FIG. 1.

Referring now to FIGS. 2 and 3 of the drawings, the reel stand or unwind stand 20 basically comprises a frame 22, a shaft 23 mounted thereon, a guide arm mounting plate 24 mounted on one end of the shaft 23, a plurality of guide arms 25 mounted on the guide arm mounting plate 24, a reel support arm 26 mounted on each guide arm 26, a guide rod 27 pivotally mounted on each reel support arm 26 and a brake disc 28 mounted on the other end of the shaft 23. The frame 22 comprises a plurality of frame members welded or otherwise joined together including a pair of spaced apart base members **22*a*, four vertical frame members 22*b* and, a pair of base frame members 22*c* paralleledly spaced apart and joined together with vertical support members 22*b* and upper side frame members 22*c*. It can be appreciated that the frame 22** may be varied in construction and that the particular frame illustrated is merely exemplary.

The shaft 23 is mounted on the frame 22 by means of a pair of pillow blocks or bearings 29 mounted on each of the shaft support frame members **22*d*. The shaft is freely rotatable within the bearings. The caliper disc break 28 includes a disc hub 28*a*, break disc 28*b* and break caliper 28*c*. Any suitable caliper disc break may be used. The guide rods 27 are pivotally mounted on the reel support arms 26 by means of a hinged pin 26*a*. The arms 26 also include a positioning pin 26*b* which enables the rods 27 to be locked in either a horizontal position as illustrated or a vertical position ninety degrees from the horizontal one. FIGS. 2 and 3 of the drawings illustrate the guide rods 27 in position for receiving a reel of insulating material 21. After the insulating reel has been positioned on the arms 26, the rods 27 are raised to a vertical position and locked in place as seen in FIG. 1**.

Figure 11:
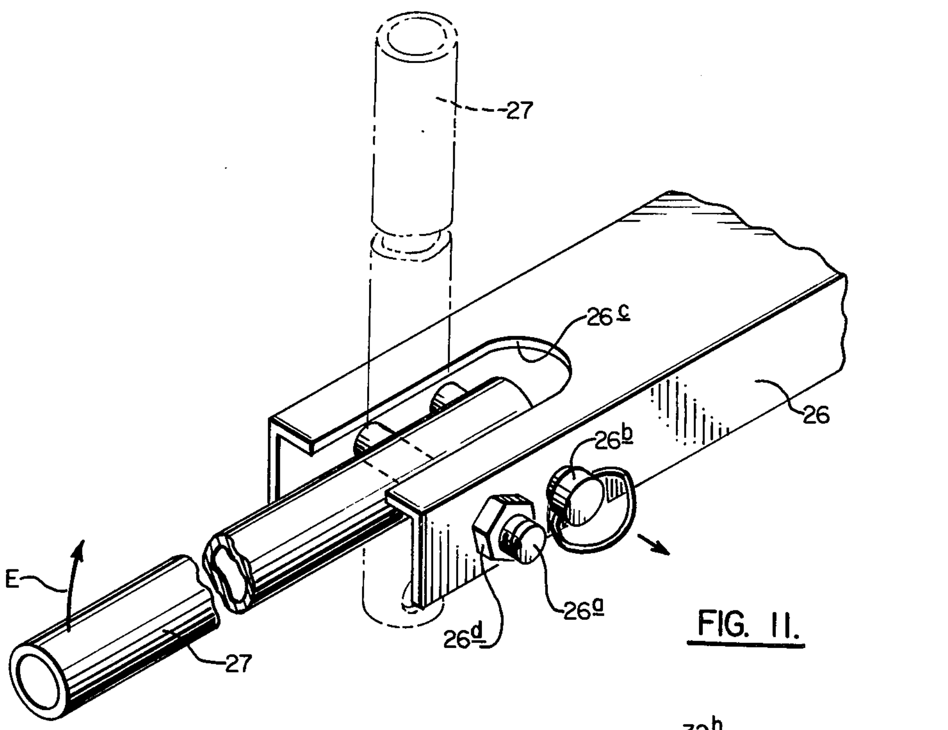
FIG. 11 is an enlarged perspective view of a reel support arm.

Referring to FIG. 11, a portion of reel support arm 26 is illustrated showing a guide rod 27 pivotally mounted therein. The reel support arm 26 has an opening **26*c* cut therein for receiving the rod 27. The member 26 is conveniently a channel member, and the portion 26*c* removed therefrom is removed from the web of the member 26. Other types of construction are of course suitable. The reel support arm 26 also has suitable openings therein in the flanges thereof for receiving the hinge pin 26*a* and the positioning pin 26*b*. The rod 27 also has suitable holes or openings therein for receiving pins 26*a* and 26*b*, respectively. The rod 27 is pivotally mounted on the hinge pin 26*a* so it may be raised from a horizontal position to a vertical position in the direction of the arrow E. A nut 26*d* secures the hinge pin 26*a* on the arm 26. When the positioning pin 26*b* is in the position illustrated in FIG. 11, the rod 26 is locked in a horizontal or longitudinal position with the guide support arm 26. To place a reel of insulating material on the unwind stand 20, each of the rods 27 are placed in the position as illustrated in FIG. 11. After the reel has been placed on the support arms 26, the positioning pin 26*b* is withdrawn and the rod 27 moved in the direction of the arrow E to the vertical position shown in FIG. 11. The positioning pin is then inserted in the holes in the arm 26 from which it was previously removed, thus locking the rod in a vertical position and thus maintaining the reel 21 on the unwind stand 20**. Any other suitable reel support mechanism or apparatus may be used as desired.

Figure 4:
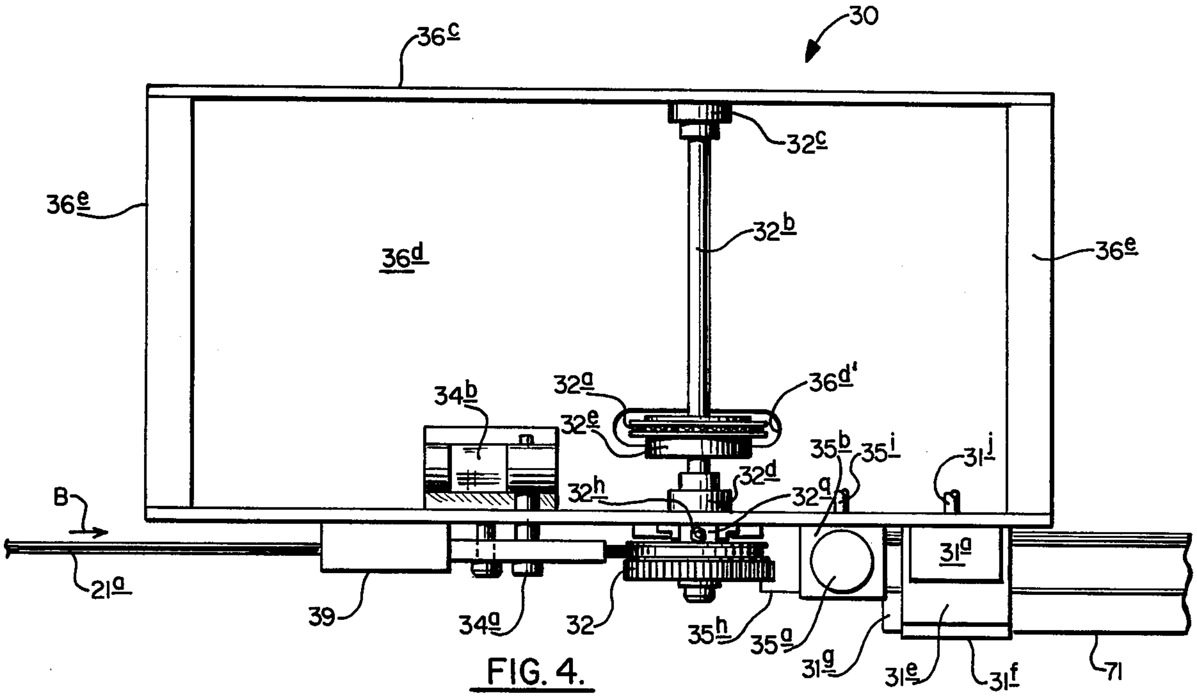
FIG. 4 is an enlarged top view of the thermal barrier feeder of the assembly line machinery of FIG. 1.
Figure 5:
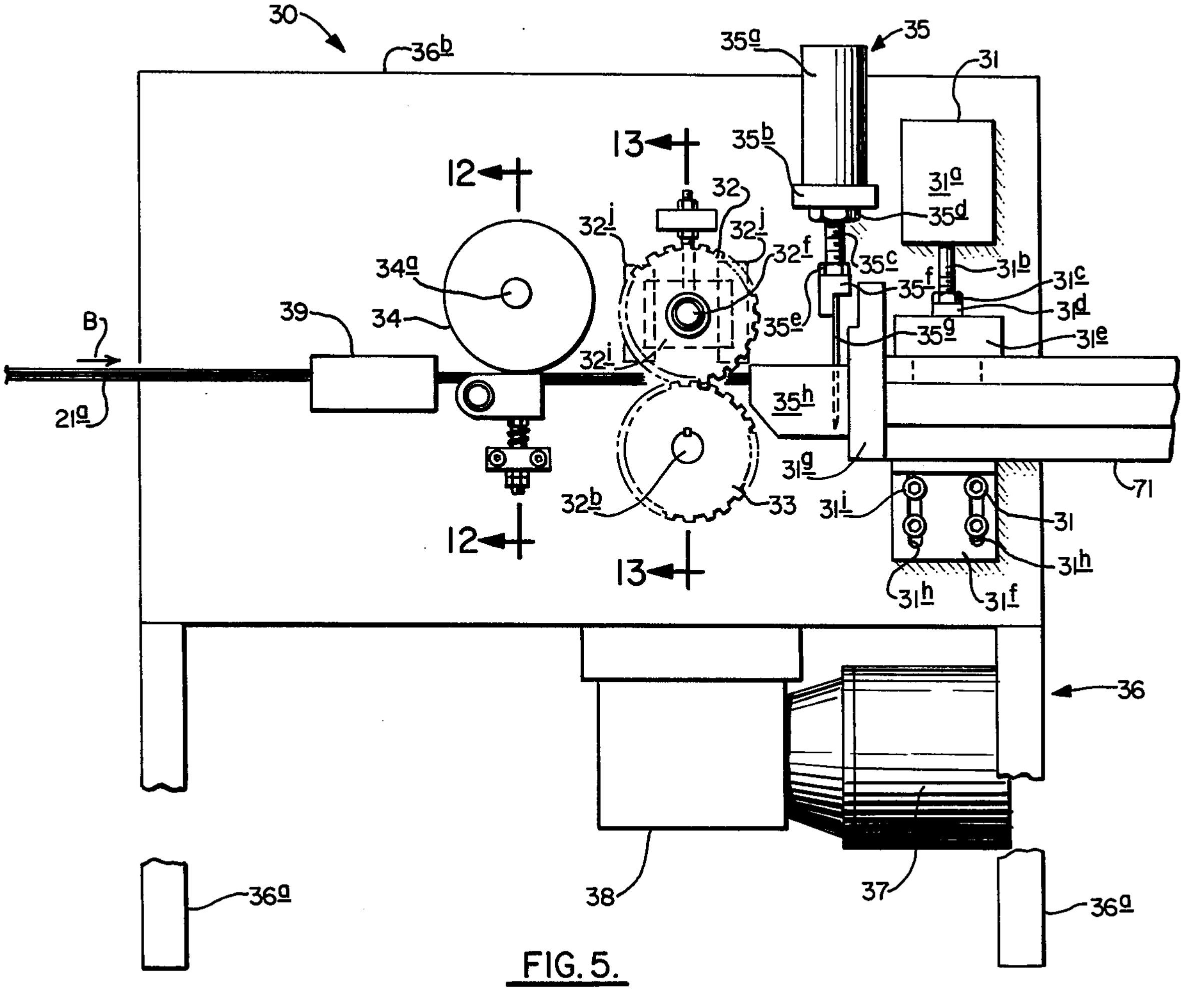
FIG. 5 is a front view of the feeder of FIG. 4.

The details of the feeder 30 are seen in FIGS. 4 and 5. The feeder includes a frame 36, a motor 37 mounted thereon, a speed reducer 38 mounted on the motor with a suitable sprocket and chain assembly for driving the upper and lower drive wheels 32 and 33, respectively, an input guide 39, measuring wheel 34, drive wheels 32 and 33, a knife 35 and a clamp 31, all of which are suitably mounted on the frame 36. The frame 36 includes four vertical support members **36*a* on which are mounted a front plate 36*b*, a rear plate 36*c*, a base plate 36*d*, and connecting bars 36*e*. Any other suitable framing mechanism may be used to provide the support for the various components of the Feeder 30**.

The clamp assembly 31 includes clamp air cylinder **31*a*, a cylinder rod 31*b*, a jam nut 31*c* a clamp 31*d*, a clamp guide 31*e*, an extrusion or shape support 31*f* and an extrusion or shape positioning plate 31*g*. The angle iron extrusion support member 31*f* has a pair of slots 31*h* therein and is mounted on the front plate 36*b* by means of a plurality of socket head cap screws 31*i* or other suitable fasteners. The extrusion support 31*f* may be moved vertically to a desired position to support the base of the extrusions 70 and 71 in a desired position. The extrusion positioning plate 31*g* is in a fixed position and so located between the knife unit 35 and clamp assembly 31 that when the shapes 70 and 71 are abutted thereagainst, the shapes are in a proper position for receiving the insulating member 21*a*. The air cylinder 31*a* actuates the cylinder rod 31*b* so that the clamp 31*d* and clamp guide 31*e* thereon are moved into holding contact with the shapes 70 and 71 to hole them in the desired position during the insertion operation. The air cylinder 31*a* has an air line 31*j*** (partially shown) for connecting the air cylinder to a suitable valve and air supply.

The knife or knife assembly 35 includes an air cylinder **35*a*, a block 35*b* for holding same, a cylinder actuating rod 35*c*, a jam nut 35*d* and a jam nut 35*e* positioned on the rod 35*c*, a knife holder 35*f* mounted on the end of the rod 35*c* and a knife 35*g* positioned in the knife holder 35*f*. The air cylinder block 35*b* is mounted on the front plate 36*b*. A cutting block 35*h* is also mounted on the front plate 36*d*. An air line 35*i* (partially shown) connected to a suitable valve and air supply provides air to the air cylinder 35*a* for actuating the knife blade 35*g* for cutting or severing the insulating barrier 21*a*** when an appropriate signal is given thereto.

The base plate **36*d* has an opening 36*d* for receiving a drive chain 32*a* connecting the drive wheels 32 and 33 with the motor 37**.

The lower drive wheel 33 is mounted on a shaft **32*b* positioned in bearing blocks 32*c* and 32*d* fixed on rear plate 36*c* and front plate 36*b*, respectively. A drive sprocket 32*e* is mounted on the drive shaft 32*b* for receiving the drive chain 32*a*. The lower drive wheel 33 is mounted on the end of the shaft 32*b* which extends through a suitable opening therefor in the front plate 36*b***.

The upper drive wheel 32 is mounted on axle **32*f* mounted in front plate 36*b*. The upper drive wheel 32 is adjustable so as to accommodate various sizes of insulating material or barriers. Such mechanism inclides a bolt holder 32*g* mounted on the front plate 36*b* and a bolt 32*h*, a slide block 32*i* and slides 32*j* suitably positioned thereon. The drive wheels 32 and 33 advance the barrier member 21*a* in the direction of the arrow B so as to insert the member 21*a* into the shapes 70 and 71**.

Figure 13:
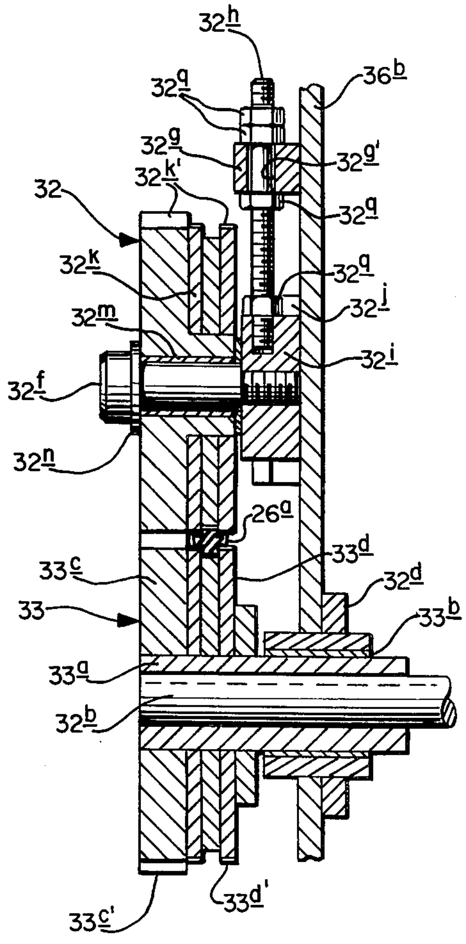
FIG. 13 is a sectional view taken along line 13—13 of FIG. 5 illustrating the drive means or section of the thermal barrier feeder.

Additional details of the drive wheels 32 and 33 are seen in FIG. 13. Upper drive wheel or drive unit 32 is mounted on the plate **36*b*. Lower drive wheel or drive unit 33 is mounted on the shaft 32*b* which extends through an opening in the plate 36*b*. The unit 32 includes a drive gear 32*k* having teeth 32*k'* thereon which is mounted on bushing 32*m* in which axle bolt 32*f* is positioned therethrough and inserted into movable slide block 32*i*. Slide block 32*i* is slidably mounted in slide 32*j* which is fixed to plate 36*b*. A thrust bearing 32*n* is also positioned on the axle 32*f* between the head of axle 32*f* and drive gear 32*k*. Barrier drive wheel 32*p* having teeth 32*p'* thereon is fixed to the drive gear 32*k* so as to move therewith. The bolt holder 32*g* is fixed to the plate 36*b* above the slide 32*j* and has an opening 32*g'* therein for receiving the bolt 32*h*. The bolt 32*h* also extends into and is fixed to the movable slide block 32*i*. Nuts 32*q* are appropriately positioned on the bolt 32*h* so as to retain the bolt in a desired position on the bolt holder and in the slide block. By adjusting the nuts 32*q*, the slide block 32*i* may be moved vertically within the slide 32*j* so that the drive wheel 32*p* will be in an appropriate position for driving the insulating barrier material 26*a*** on the top side thereof.

The drive shaft **32*b* has a hub 33*a* thereon positioned in a bushing 33*b* in a bushing support member or bearing 32*d* mounted on plate 36*b*. A drive gear 33*d* having teeth 33*d'* thereon is mounted on the hub 33*a* on the shaft 32*b* and meshes with gear 32*k* so as to drive the gear 32*k*. Drive wheel 33*d* on hub 33*a* and having teeth 33*d'* thereon moves or rotates shaft 32*b* and drives the underside of barrier 26*a***.

The measuring wheel 34 is also mounted on the front plate **36*b* in a suitable manner on a shaft 34*a* connected to a suitable electrical pulse generator 34*b*, also mounted on the front plate 36*b*. The input guide 39 is also mounted on the front plate 36*b*. The input guide 39 is also mounted on the front base plate 36*b*** in a suitable manner.

Figure 12:
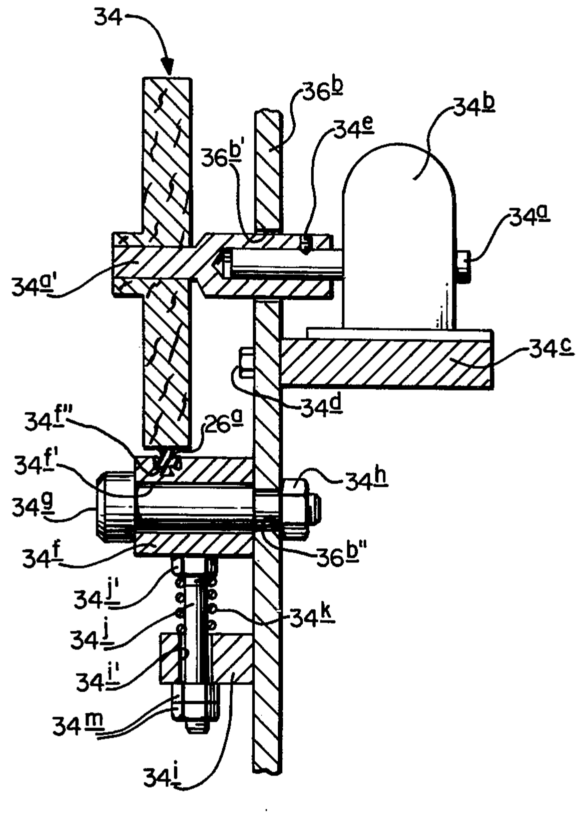
FIG. 12 is a sectional view taken along line 12—12 of FIG. 5 illustrating the measuring means or section of the thermal barrier feeder.

Referring now to FIG. 12, the details of the measuring wheel 34 are illustrated. A pulse generator mounting block **34*c* is affixed to front side plate 36*b* by means of a bolt 34*d* through suitable openings in the plate 36*d* and mounting block 34*c*, respectively. The pulse generator 34*b* having a shaft 34*a* is mounted on the mounting block 34*b*. A shaft extender 34*a'* is affixed to the shaft 34*a* and held in place thereon by means of a set screw 34*e*. The plate 36*b* has an opening 36*b'* therein for receiving the shaft extender 34*a'*. The measuring wheel 34 is positioned on the shaft extender 34*a'*. A movable guide block 34*f* is mounted on the plate 36*b* below the measuring wheel 34 by means of a pivot bolt 34*g* and a pivot bolt nut 34*h*. The side plate 36*b* has a suitable opening 36*b''* for receiving the pivot bolt 34*g*. The movable guide block 34*f* has an opening 34*f'* therethrough sufficiently large to permit vertical movement of the block 34*f* when the nut 34*h* is loosened. The block may be moved to accommodate a particular size of insulating material or barrier. The block 34*f* also has a suitable opening 34*f''* for receiving the barrier or insulating material 26*a*. Also mounted on the plate 36*b* below the guide block 34*f* is a spring holding block 34*i*. The block 34*i* has an opening 34*i'* for receiving the spring bolt 34*j*. A spring 34*k* is mounted on the bolt 34*j'*. Nuts 34m retain the bolt 34*j* in the block 34*i*. The spring 34*k* urges the bolt 34*j* into contact with movable guide block 34*f*** so as to urge the vinyl material 26*a* therein against the measuring wheel 34.

Any other suitable feeder may be used. The feeder should have some type of means to receive and feed the barrier material into the metal member or members and to stop the feeding operation when an appropriate length of insulating material has been inserted into the metal member or members. Preferably, the feeder also contains a clamping means for holding metal members in place during insertion operations and a knife means for cutting or severing the inserted barrier material from the reel of barrier material. The clamping means and knife means can each be separate components and not made specifically a part of the feeder unit. In some instances, such clamping or holding and cutting operations can be conducted manually, although this would not be as efficient as the automatic operation disclosed.

Figure 6:
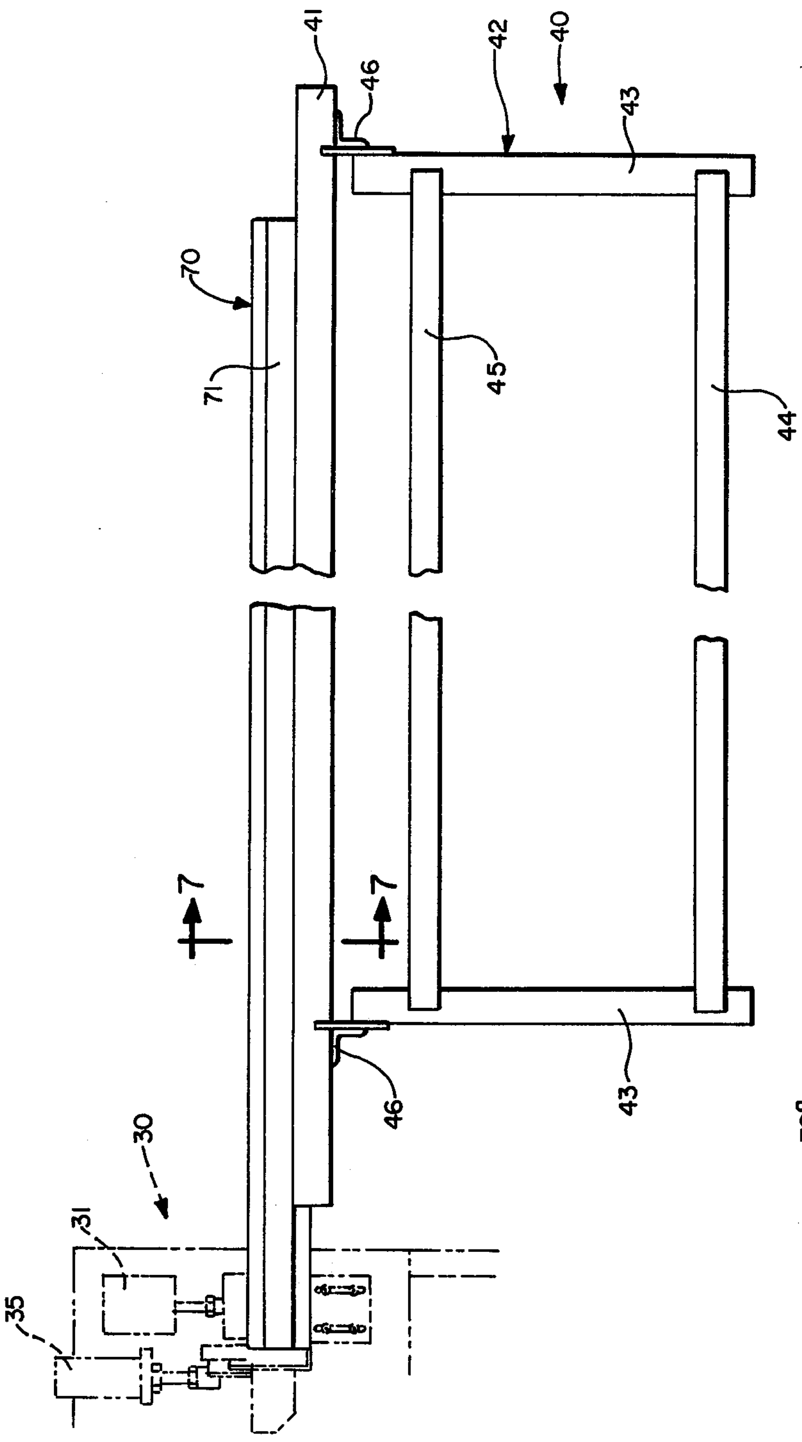
FIG. 6 is an enlarged front view of the guide box and support frame of the assembly line machinery of FIG. 1.
Figure 7:
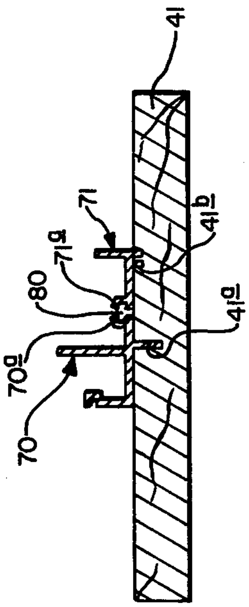
FIG. 7 is a section along line 7—7 of FIG. 6 and shows the configuration or cross-sectional shape of the metal members to be joined with an insulating member and the position of the metal members in the guide box.

Referring to FIGS. 6 and 7, the guide box 40 with metal shapes 70 and 71 thereon is illustrated in more detail. The guide box unit 40 includes a guide box 41 mounted on a frame 42. The frame 42 includes vertical guide box support members 43 joined together and spaced apart by base frame members 44 and top frame members 45. Brackets 46 are fixed to the support members 43 for supporting the guide box 41. It can be appreciated that any other suitable structure may be used for holding the guide box 41. The guide box 41 is a longitudinally extending wooden member or board which has grooves 41*a* and 41*b* therein for receiving portions of the shapes 70 and 71, respectively as illustrated in FIG. 7. The guide box 41 is merely illustrative of a very simple type of guide box. It may be made of wood or any other suitable material, e.g., metal and plastic. For normal operations, a guide box having a multiplicity of grooves for receiving a variety of types of shapes would be employed. All that is necessary is that the guide box hold the metal shapes in a suitable position for receiving the barrier material. Shapes 70 and 71 are relatively simple shapes and are shown in their position for receiving the thermal barrier 21*a* in the opening 80 between members 70 and 71. The opening 80 is of a size and shape so as to readily receive a somewhat similarly shaped, in cross-section, thermal barrier material. The flanges or portions 70*a* and 71*a* of the members 70 and 71, respectively, are in their pre-crimping or pre-stitching position. The metal shapes are therefore illustrated in the shape in which they are normally extruded or otherwise prepared.

Figure 8:
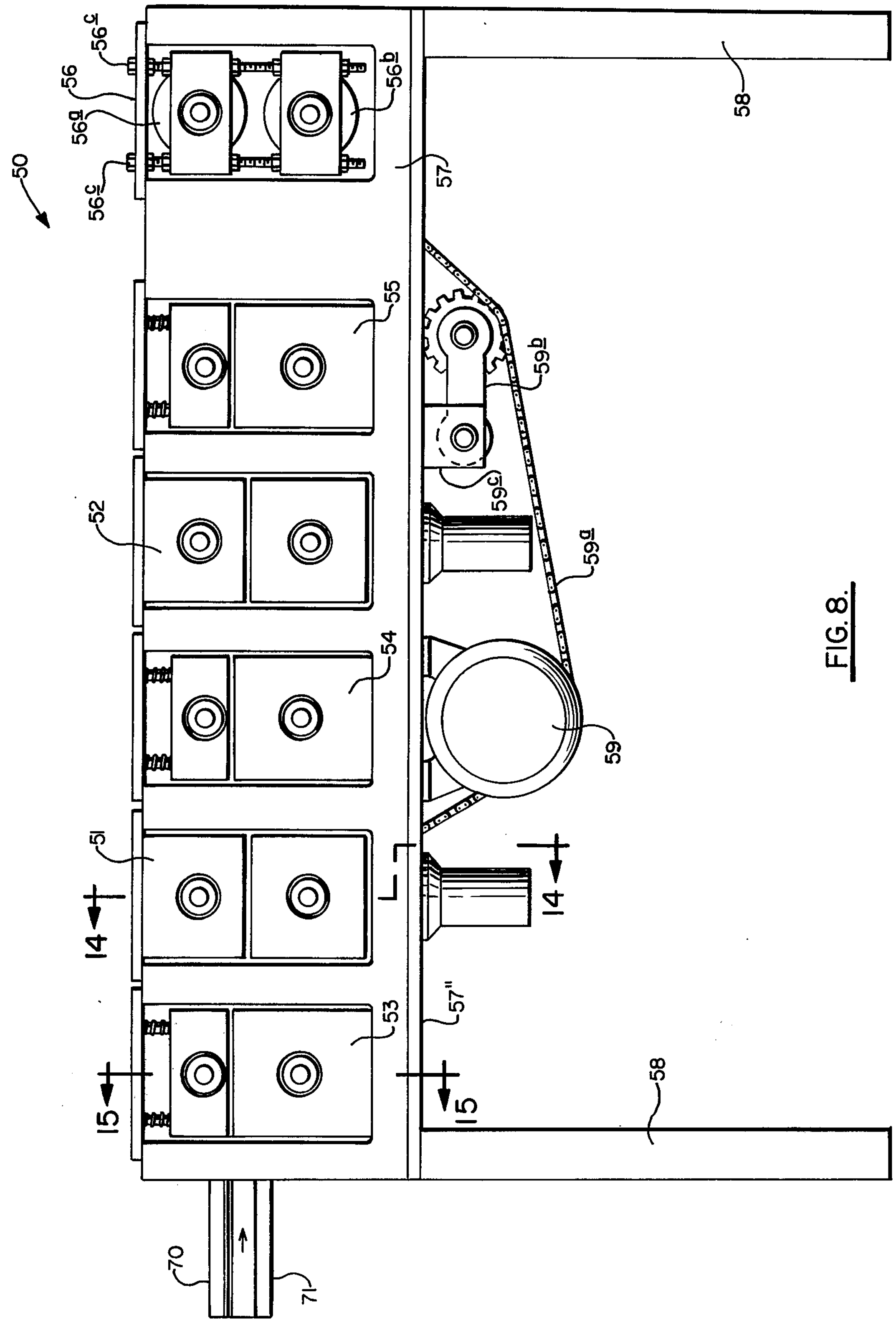
FIG. 8 is an enlarged front view of the stitcher or crimping machine of the assembly line machinery of FIG. 1.

Referring now to FIG. 8, the stitcher or crimping machine 50 includes a first stitch station or unit 51, a second stitch station or unit 52, a plurality of guide block assemblies 53, 54 and 55 and an ejector station 56 mounted on side plates 57 and 57' mounted on a base plate 57" mounted on support members 58. Additionally, the stitcher 50 includes a combination motor and reducer unit 59 suitably mounted on the underside of the base plate 57" with a drive chain 59*a*. The chain tensioner 59*b* is also mounted on the base 57 by means of a mounting block 59*c*.

The ejector station 56 includes a toothless drive wheel 56*a* and a lower idler wheel 56*b* and adjusting screws 56*c*. The ejector station 56 receives the metal members with barrier crimped therein and ejects the extrusion or finished part T out of the stitcher 50 and also straightens the element T.

The guide blocks 53, 54 and 55 are substantially identical and are made for a particular shape. The guide blocks are removable and an additional series of guide blocks may be placed in the stitcher for accommodating shapes of configurations other than those illustrated. The stitch stations 51 and 52 are fixed in the machine and remain the same for each identical operation. The stitch stations are adjustable to accommodate particular shapes. Details of the stitch stations and guide stations are seen in FIGS. 14 and 15.

Figure 14:
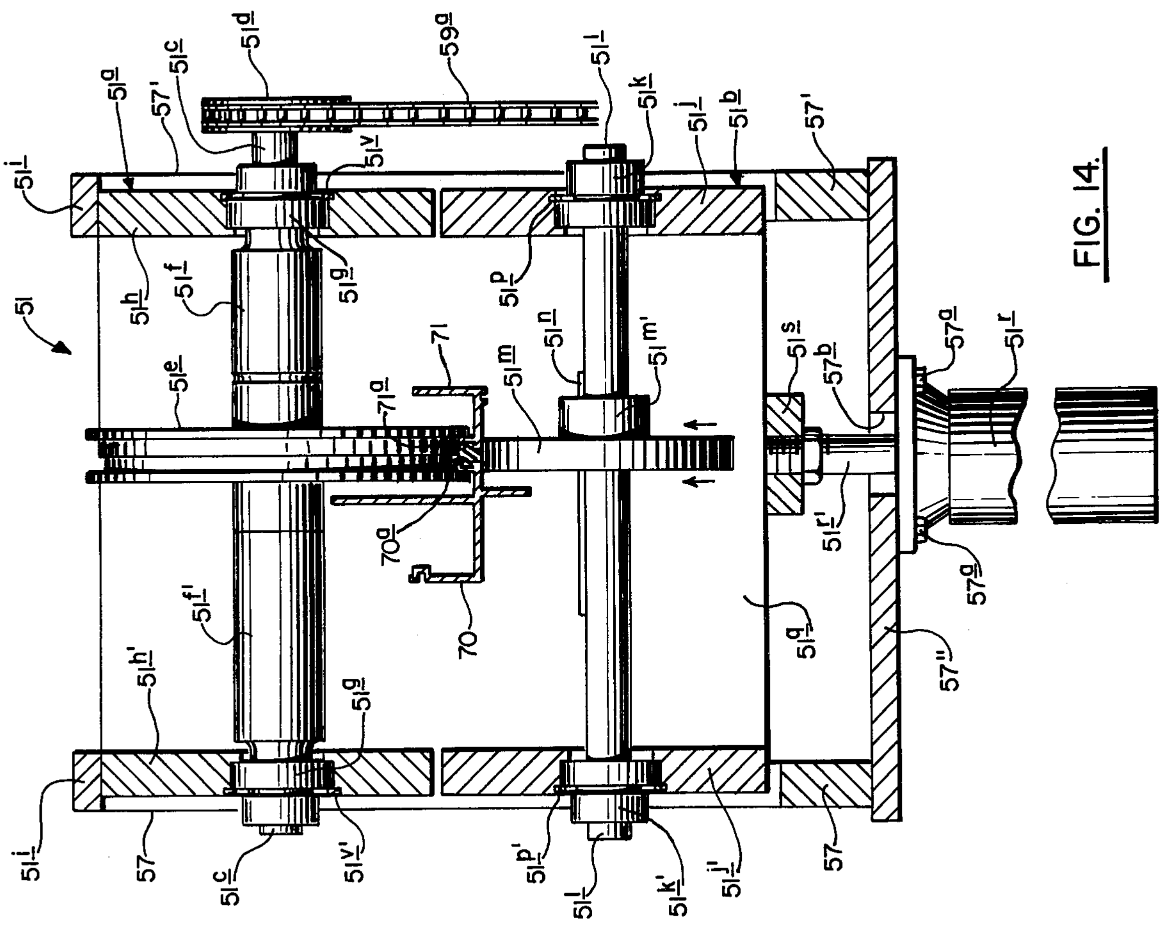
FIG. 14 is a sectional view taken along line 14—14 of FIG. 8 illustrating a stitching or crimping means or station of the stitcher or crimping machine.

Referring now to FIG. 14, a stitch station is illustrated in detail. Stitch station 51 is mounted on side plates 57 and 57' and base plate 57" of the stitcher 50. The stitch station 51 includes an upper fixed portion 51*a* and a lower movable portion 51*b*. The upper portion 51*a* includes a drive shaft 51*c* which has a drive sprocket 51*d* on one end thereof for receiving the chain 59*a*. The shaft 51*c* has a stitch or crimping wheel 51*e* fixed thereto with spacers 51*f* and 51*f'* on either side thereof. Bearings 51*g* and 51*g'* support the shaft in the stitcher and are mounted in side plates 51*h* and 51*h'*, respectively. A pair of snap rings 51*r* and 51*r'* are positioned respectively. on the shaft 51*c* adjacent bearings 51*g* and 51*g'*, respectively. Holding bars 51*i* and 51*i'* hold the upper portions 51*a* in position to the stitcher 50. The lower movable portion or backup block 51*b* includes side plates 51*j* and 51*j'* in which are mounted bearings 51*k* and 51*k'* for supporting the backup wheel shaft 51*l*. Backup wheel 51*m* having hub 51*m'* is mounted on the shaft 51*l* and fixed thereon by means of shaft key 51*n*. A pair of snap rings 51*p* and 51*p'* are also positioned on the shaft 51*l* adjacent bearings 51*k* and 51*k'*, respectively. A cross brace 51*q* connects or joins the side plates 51*j* and 51*j'*. The lower or backup wheel 51*m* is movable and controlled by means of an air cylinder 51*r* mounted on the stitcher base plate 57" by means of bolts 57*a* or other suitable means. The plate 57" has an opening 57*b* therein for receiving the air cylinder shaft 51*r'* which is mounted to a cross plate 51*s*. As the air cylinder shaft 51*r'* is actuated up or down, the block 51*b* is moved therewith so that an operator may vary the backup force for a particular stitching or crimping operation depending upon the particular metal members being stitched or crimped. The stitch wheel and backup wheel are both hardened steel rollers with the stitch wheel having teeth thereon. The stitch wheel 51*e* is grooved or so constructed that only one metal member or one side of a metal member is crimped as the metal members 70 and 71 pass therethrough.

The stitch station 52 is similarly constructed to the stitch station 51, except that the wheel 51*e* is so constructed that the other side of the metal member or metal members is crimped. As illustrated in FIG. 14, the stitch wheel 51*e* is shown crimping the flange 51*a* of the member 71. The flange 70*a* is crimped by the stitch station 52.

Figure 15:
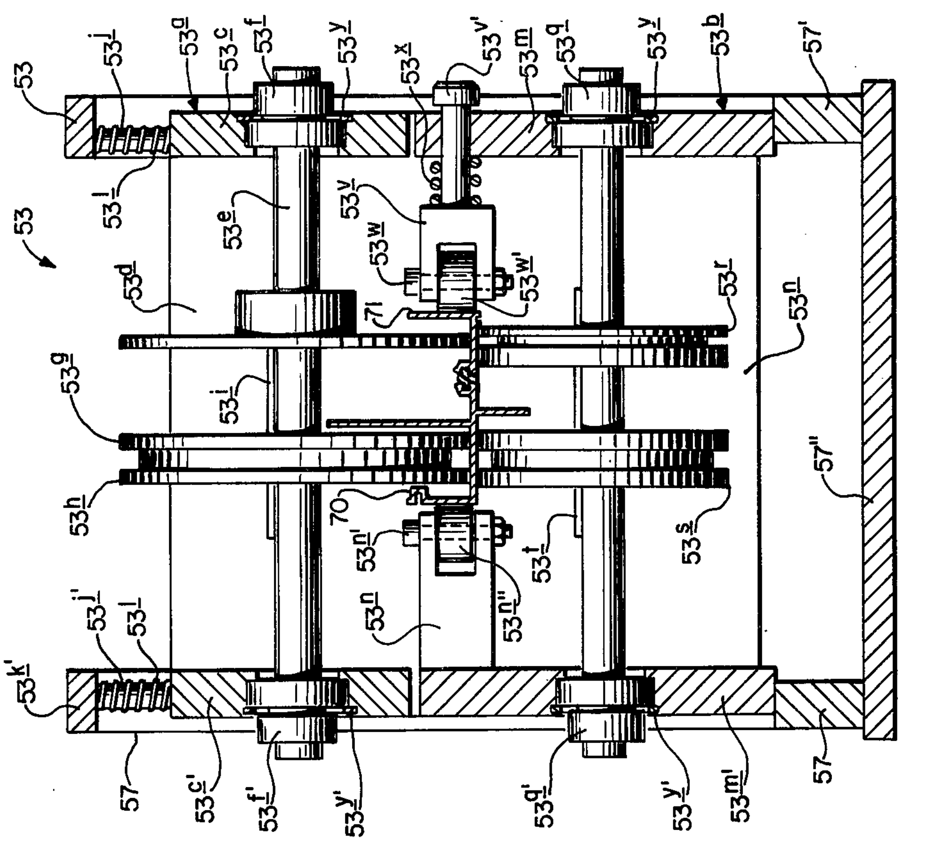
FIG. 15 is a sectional view taken along line 15—15 of FIG. 8 illustrating a guide means or station of the stitcher or crimping machine.

The guide station or guide box assembly 53 is seen in detail in FIG. 15. The guide station is also mounted in side plates 57 and 57' and base plate 57" of the stitcher 50. The guide stations are made as a separate block unit and each station has an upper block 53*a* and a lower block 53*b*. The upper block 53*a* includes a pair of side plates 53*c* and 53*c'* joined together in a spaced apart relationship by cross brace 53*d*. The shaft 53*e* is mounted in bearings 53*f* and 53*f'* positioned in side plates 53*c* and 53*c'*, respectively. A pair of snap rings 53*y* and 53*y'* are positioned on the shaft 53*e* adjacent bearings 53*f* and 53*f'*, respectively. A pair of guide wheels 53*g* and 53*h* are mounted on the shaft 53*e*. A key 53*i* enables the guide wheels to be locked in a predetermined position on the shaft 53*e*. A pair of spring guide posts or pins 53j and a pair of spring guide posts or pins 53j' are mounted on the top of side plates 53c and 53c', respectively. Holding bars 53k and 53k' are also positioned on side plates 53c and 53c', respectively. Each guide post has a spring 531 thereupon. The guide posts or pins are connected to the holding bars, but are positioned therein through holes in the holding bars therefor. The pins pass through the holding bars when the block 53a is raised. The springs are held in position by the pins and act to push the upper block downwardly. As the metal shapes pass through the machine, the upper block is raised slightly, compressing the springs.

The lower block 53b includes side plates 53m and 53m' joined together by cross brace 53n. A shaft 53p is mounted in bearings 53q and 53q', respectively, mounted in the side plates 53m and 53m', respectively, A pair of lower guide wheels 53r and 53s are mounted on the shaft 53p and spaced apart therefrom each other and retained in a predetermined position by means of key 53t. A fixed side guide yolk 53n is mounted on the inside of side plate 53m' and includes an axle 53n on which roller 53n'' is positioned thereon. A movable side guide yolk 53v is mounted on guide bolt 53n'' positioned in a suitable opening therefor in side plate 53m. Yolk 53v includes an axle 53w on which a wheel 53w' is positioned thereon. A spring 53x mounted on the guide bolt 53v' urges the yolk 53v and the wheel 53w' thereon against the shape 71 which in turn urges the shape 71 and shape 70 against the wheel 53n''. Snap rings 53y and 53y' are also positioned on the shaft 53p adjacent bearings 53q and 53q', respectively. The guide blocks are readily removable and permit a rapid change out from one shape to another. The guide blocks position the metal shapes in a proper location for stitching or crimping.

The guide wheels are illustrative of one particular type. It can be appreciated that they may be of any suitable type as desired. Such wheels are preferably made of a material such as a phenolic resin, vinyl or other suitable material which does not damage the metal shapes. The various guide wheels also have set screws therein for fixing the wheels to their respective shafts in a predetermined position.

Guide stations 54 and 55 are similarly constructed to guide station 53 and are also removable from the stitcher 50. For any particular operation, all of the guide stations are of identical construction and have their wheels set in a similar position.

The guide stations before each stitching station hold the metal shapes and barrier therebetween in proper alignment for each successive crimping or stitching operation. Guide stations and stitch stations can be so constructed and assembled that stitching or crimping can be conducted on whichever metal member or side of metal member desired. The last guide station guides the metal shapes with barrier material locked therein or therebetween into the ejector station or unit. The ejector station not only ejects the finished part from the stitcher or stitcher assembly to the take-off unit but also straightens the finished part thereby correcting any distortion which may have occurred during the stitching operation.

Figure 9:
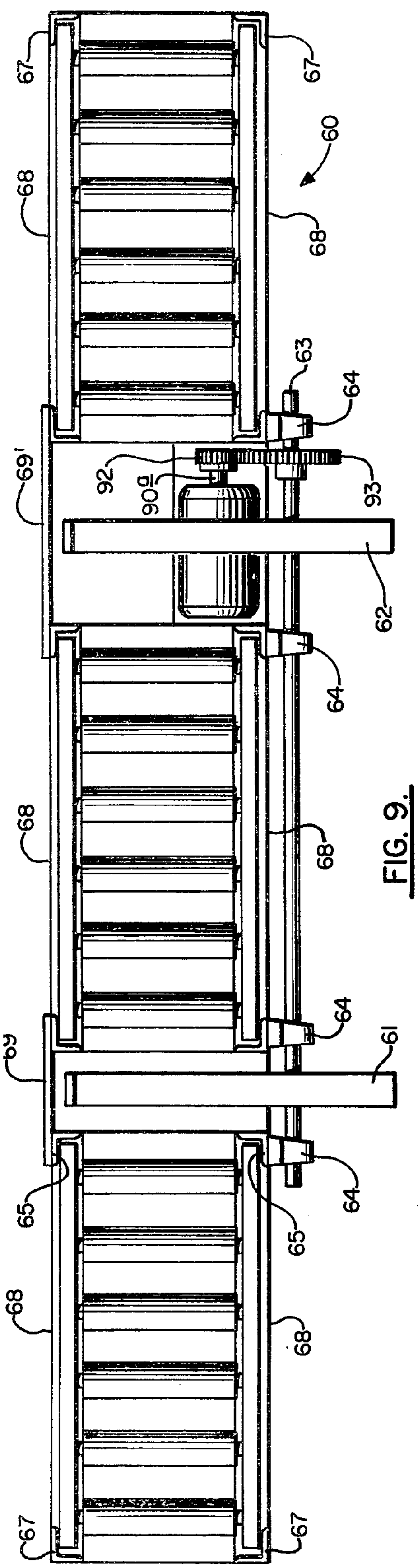
FIG. 9 is an enlarged top view of the take-off unit of the assembly line machinery of FIG. 1.
Figure 10:
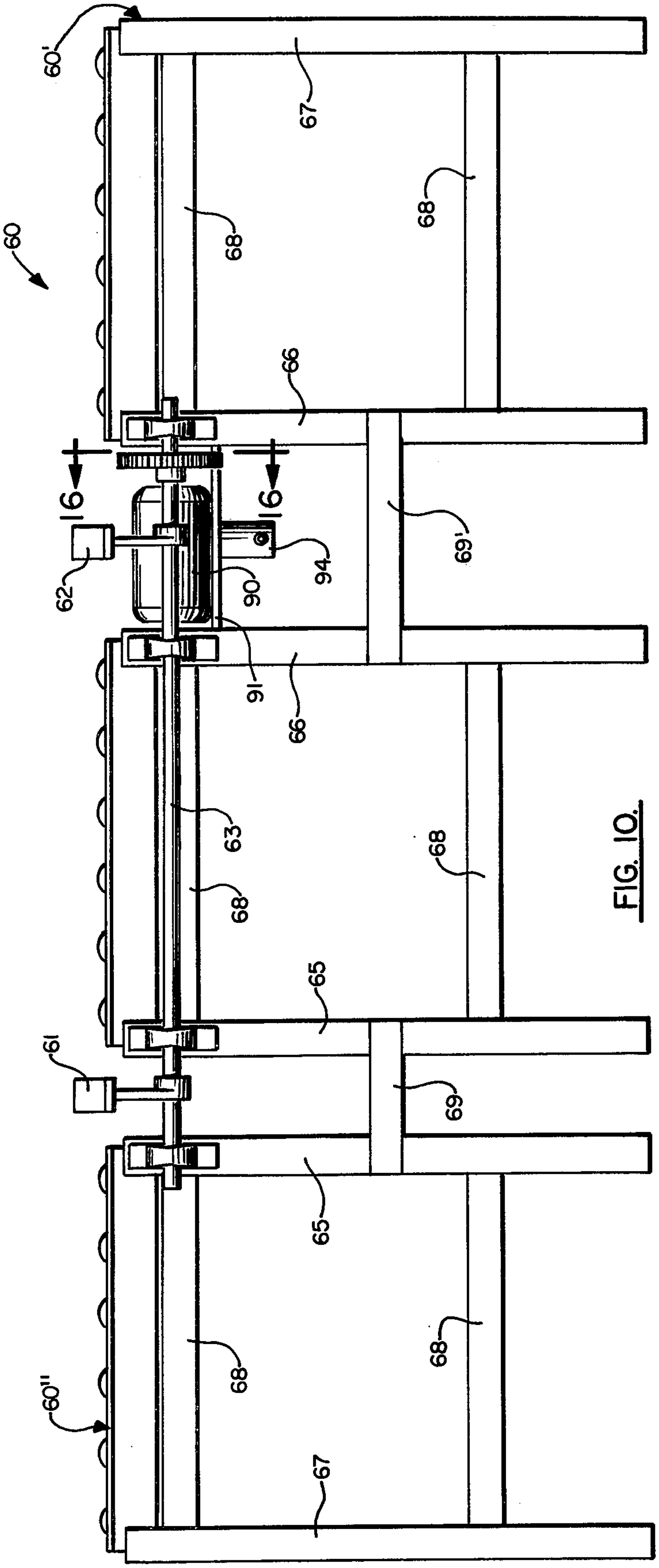
FIG. 10 is a front view of the take-off unit of FIG. 9.

Referring to FIGS. 9 and 10, the take-off unit 60 includes dump arms 61 and 62 mounted on a shaft 63 held by bearings 64, conveniently mounted on frame support members 65 and 55. In addition to the vertical support members 65 and 66, frame 60' includes end vertical support members 67 and horizontal joining framing members 68 and additional horizontal joining members 69 and 69'. A roller conveyor 60'' is mounted on the support members 68 and 67. An air rotary actuator 90 is mounted on a motor base plate 91 mounted on vertical support members 66 of the frame 60'. The rotary actuator 90 has a shaft 90a extending therefrom on which is mounted a gear 92 which drives a gear 93 mounted on the shaft 63. An air valve 94 is also mounted on the plate 91. The roller conveyor operates in the customary manner, and some of the rollers are further spaced apart than others to provide an area for pivotal movement of the dump arms 61 and 62. The dump arms 61 and 62 are affixed to the shaft 63; and, as the shaft is rotated when appropriately actuated or driven by the actuator 90, and raises the arms from a horizontal position to a raised position so that a member T thereon will slide off of the unit 60 and into a suitable receptacle.

Figure 16:
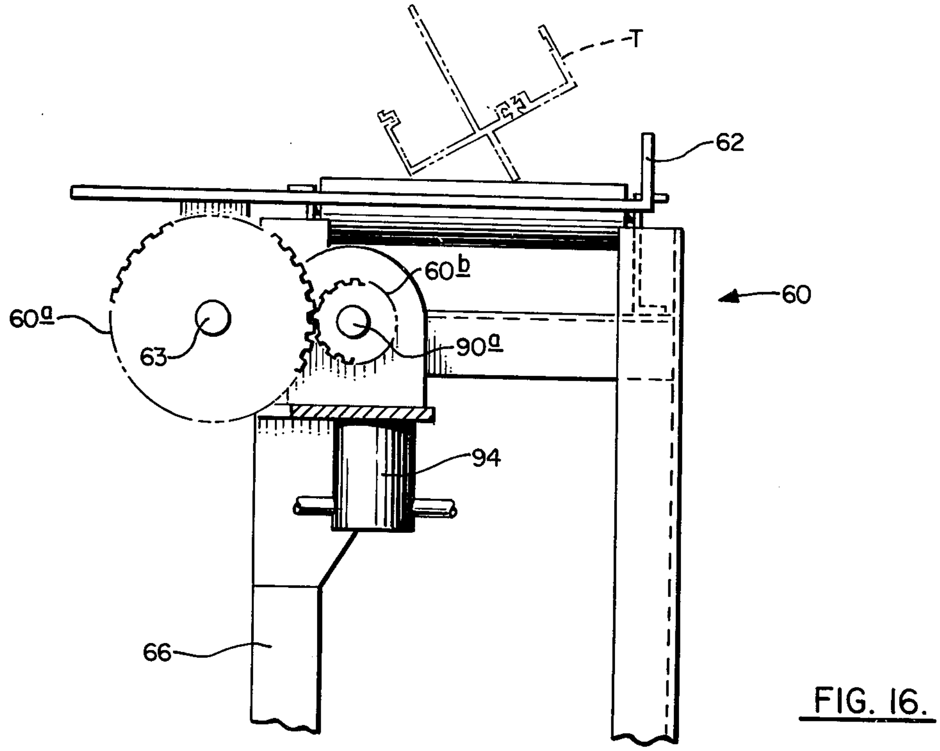
FIG. 16 is an end view taken along line 16—16 of FIG. 10 illustrating the dump arm mechanism of the take-off unit with a finished thermal barrier extrusion or member thereon in position just prior to activation; and, FIG. 16A is a view similar to that of FIG. 16, but with the dump arm in a raised position to discharge the finished thermal barrier member.
Figure 16A:
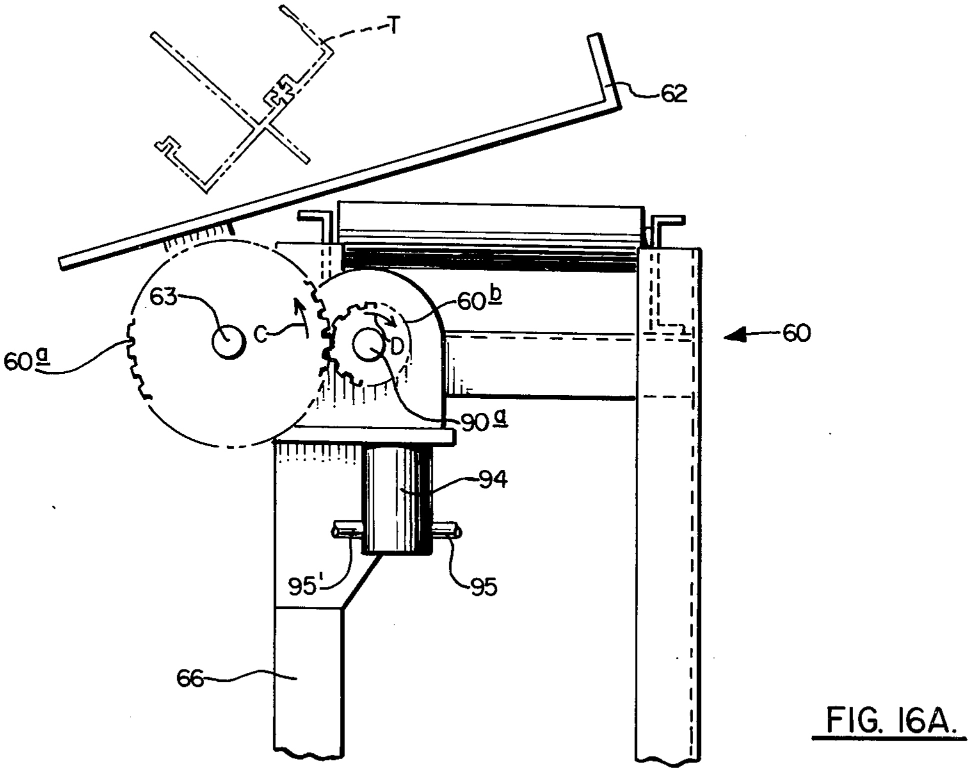

Referring now to FIGS. 16 and 16A, a completed thermal barrier shape T is illustrated in position on the take-off unit 60 prior to activation of the dump arms and in position after the dump arms have been activated. Dump arm 62 is shown in a raised position in FIG. 16A wherein the finished part T is moved from the position shown in FIG. 16 to the position shown in FIG. 16A and hence into a basket or other suitable container. Dump arm 62, as well as dump arm 61, is raised or lowered by means of gear 60a fixed to the shaft 63 which is caused to rotate in the direction of the arrow C by action of the smaller gear 60b rotated in the direction of the arrow D and fixed to the air rotary actuator shaft or rod 90a actuated by the air valve 94. The air valve 94 is connected to a suitable air supply source by means of lines 95 and 95'. It can be appreciated that the frame of the take-off unit or the take-off unit itself can be of various constructions. It is only essential that rollers or other suitable means be provided for moving a finished part thereon and that a dumping mechanism or some other means be provided for removing the finished part from the take-off unit.

Although a take-off unit of some type is preferred, the finished parts can be manually handled, if desired. Such a manual operation would not be as efficient and would probably require the services of an additional person to receive the finished parts as they are ejected from the stitcher.

Metal shapes are preferably extruded aluminum shapes, but any other suitable metal or various made metal shapes may be used. The term aluminum includes all aluminum and aluminum alloys employed or capable of being employed in the manufacture of windows, doors, frames therefor, curtain walls, and the like and in the building or construction industry in general. Such metal shapes may be of various lengths, and may be of any desired configuration in cross-section as long as they are so constructed as to receive a barrier material and have portions thereof which can be crimped onto the barrier material after it has been inserted.

The insulating material or barrier is preferably made of plastic. Any other suitable materials may be used which have the desired characteristic of thermal conductivity, strength, and rigidity. Although a material of sufficient flexibility that it can be made into reels or rolls is preferred, material of greater rigidity can be used. In such case, lengths of barrier material would have to be fed into the feeder by hand or some other suitable means.

The foregoing disclosure and description of the invention is illustrative and explanatory thereof, and various changes in the size, shape, and materials, as well as in the details of the illustrated construction may be made within the scope of the appended claims without departing from the spirit of the invention.

What is claimed is:

1. An apparatus for making a unitary thermal break construction element comprising a feed means for inserting an insulating material into metal shapes, adjacent to and following said feed means a guide means for positioning two spaced apart metal shapes thereon into which the insulating material is to be inserted, adjacent to and following said guide means a crimping means for receiving the two metal shapes with the insulating material therein and for crimping each of the metal shapes on the insulating material thereby providing the unitary thermal break construction element, said crimping means including a plurality of crimping stations and a plurality of guide stations, with a guide station being positioned before each crimping station, each guide station positioned before each crimping station including a removable block assembly having adjusting means thereon for accommodating said guide stations to metal shapes of various cross-sectional configurations, and each of said crimping stations including an adjusting means for accommodating said crimping stations to metal shapes of various cross-sectional configurations.

2. The apparatus of claim 1, including a means for supplying the insulating material to the feed means.

3. The apparatus of claim 2, wherein said insulating material supply means includes a frame, a rotatable reel mounted thereon for receiving a reel of insulating material and means for locking the reel of insulating material on the rotatable reel.

4. The apparatus of claim 2, wherein said insulating material supply means includes a frame, a rotatable shaft mounted on said frame, a plurality of guide arms mounted on said shaft so as to move therewith, a reel support arm on each of said guide arms for receiving and supporting a reel of insulating material and a pivotally movable guide rod mounted on each of said reel support arms for locking the reel of insulating material on the reel support arms.

5. The apparatus of claim 1, wherein an ejector means is positioned after the last crimping station for receiving metal shapes and insulating material crimped therein from said last crimping station and ejecting the unitary thermal break construction element from the crimping means.

6. The apparatus of claim 5, wherein said ejector means include means for straightening the unitary thermal break construction element.

7. The apparatus of claim 1, wherein said guide means includes means for positioning and guiding a pair of metal shapes in a parallel spaced apart relationship for receiving the insulating material in the space between the metal shapes and in openings in each of said metal shapes for receiving a portion of the insulating material.

8. The apparatus of claim 1, including a take-off means for receiving said thermal break construction element and transferring it to a desired location.

9. The apparatus of claim 8, wherein said take-off means includes a frame, a plurality of rollers thereon for receiving thermal barrier construction elements for the crimping means and dump means on said frame for transferring the elements from the take-off means to a suitable receptacle or desired location.

10. The apparatus of claim 1, wherein said feed means includes a frame, drive means for receiving the insulating material and feeding the insulating material into the metal shapes, measuring means for defining a pre-determined length of insulating material to be inserted into the metal shapes, knife means for severing the pre-determined length of insulating material after the length of insulating has been inserted into the metal shapes, and clamp means for holding the metal shapes in a desired position for receiving the length of insulating material.

11. The apparatus of claim 1, wherein said guide means includes a frame and a guide box mounted thereon having groove means thereon extending longitudinally the length thereof for receiving metal shapes therein, and for positioning the metal shapes for receiving the insulating material to be inserted therein.

12. The apparatus of claim 11, wherein said groove means include a plurality of paralleledly spaced apart and longitudinally extending grooves for receiving metal shapes of a variety of cross-sectional configurations.

13. The apparatus of claim 1, wherein said crimping means includes a first crimping station for crimping one metal shape and a second crimping station for crimping a second metal shape or a second part of the same metal shape.

14. An apparatus for crimping two spaced apart metal shapes on an insulating member to thereby provide a unitary thermal barrier construction element, comprising a frame, a crimping means on said frame, a guide means on said frame, and a drive means on said frame for driving said crimping means, said crimping means comprising a first crimping station for crimping a first metal shape on an insulating member, a second crimping station for crimping a second metal shape on said insulating member, adjusting means on said crimping stations for accommodating said crimping stations to metal shapes of various cross-sectional configurations, said guide means comprising at least one guide station positioned before said first crimping station for guiding said two metal shapes with insulating member therein into a desired position for crimping operations, and said guide station comprising a removable block assembly having adjusting means thereon for accommodating said guide station to metal shapes of various cross-sectional configurations.

15. The apparatus of claim 14, comprising an ejector means on said frame positioned after said crimping station for receiving metal shapes and insulating member after the crimping operation is completed and for ejecting a unitary thermal barrier construction element from the apparatus to a desired location.

16. The apparatus of claim 14, wherein said guide means includes a second guide station positioned before said second crimping station and said second guide station comprising a removable block assembly having adjusting means thereon for accommodating said second guide station to metal shapes of various cross-sectional configurations.

* * * * *